(12) United States Patent
Kouno et al.

(10) Patent No.: US 10,138,372 B2
(45) Date of Patent: *Nov. 27, 2018

(54) POLYCARBONATE RESIN COMPOSITION AND ARTICLE MOLDED THEREFROM

(71) Applicant: MITSUBISHI GAS CHEMICAL COMPANY, INC., Tokyo (JP)

(72) Inventors: Kazuki Kouno, Kanagawa (JP); Hisayuki Kuwahara, Kanagawa (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/324,416

(22) PCT Filed: Dec. 24, 2015

(86) PCT No.: PCT/JP2015/086075
§ 371 (c)(1),
(2) Date: Jan. 6, 2017

(87) PCT Pub. No.: WO2016/125414
PCT Pub. Date: Aug. 11, 2016

(65) Prior Publication Data
US 2017/0198139 A1 Jul. 13, 2017

(30) Foreign Application Priority Data
Feb. 5, 2015 (JP) ................. 2015-021196

(51) Int. Cl.
| | | |
|---|---|---|
| C08L 69/00 | (2006.01) |
| C08F 220/14 | (2006.01) |
| C08L 33/10 | (2006.01) |
| C08K 5/13 | (2006.01) |
| C08K 5/3475 | (2006.01) |

(52) U.S. Cl.
CPC ............ *C08L 69/00* (2013.01); *C08F 220/14* (2013.01); *C08K 5/13* (2013.01); *C08L 33/10* (2013.01); *C08K 5/3475* (2013.01)

(58) Field of Classification Search
CPC combination set(s) only.
See application file for complete search history.

(56) References Cited

U.S. PATENT DOCUMENTS

| | | | |
|---|---|---|---|
| 4,745,029 A | 5/1988 | Kambour | |
| 4,906,696 A | 3/1990 | Fischer et al. | |
| 5,169,885 A * | 12/1992 | Hanayama | C07F 9/145 |
| | | | 524/152 |
| 5,200,492 A | 4/1993 | Ohnaga et al. | |
| 6,329,445 B1 | 12/2001 | Okumura et al. | |
| 6,414,100 B1 | 7/2002 | Daimon et al. | |
| 9,802,395 B2 * | 10/2017 | Onishi | C08L 33/12 |
| 2002/0040081 A1* | 4/2002 | Stein | C08K 5/1345 |
| | | | 524/121 |

| | | |
|---|---|---|
| 2009/0258235 A1 | 10/2009 | Tateishi |
| 2010/0152357 A1 | 6/2010 | Kwon et al. |
| 2010/0197850 A1 | 8/2010 | Kim et al. |
| 2012/0231234 A1 | 9/2012 | Kodama |
| 2012/0258312 A1 | 10/2012 | Higuchi |
| 2014/0371375 A1 | 12/2014 | Chung et al. |
| 2015/0210851 A1 | 7/2015 | Tajima |
| 2016/0215139 A1 | 7/2016 | Kouno et al. |
| 2016/0311204 A1 | 10/2016 | Onishi et al. |
| 2017/0327685 A1 | 11/2017 | Kouno et al. |

FOREIGN PATENT DOCUMENTS

| | | |
|---|---|---|
| CN | 101747610 | 6/2010 |
| CN | 101792500 | 8/2010 |
| CN | 103012665 | 4/2013 |
| JP | 62-131056 | 6/1987 |
| JP | 63-139935 | 6/1988 |
| JP | 64-1749 | 1/1989 |
| JP | 4-240212 | 8/1992 |
| JP | 4-359954 | 12/1992 |
| JP | 5-9359 | 1/1993 |
| JP | 9-25438 | 1/1997 |

(Continued)

OTHER PUBLICATIONS

Machine translation of JP 2014-062148 A, retrieved Feb. 2018 (Year: 2018).*

(Continued)

*Primary Examiner* — Nicole M. Buie-Hatcher
(74) *Attorney, Agent, or Firm* — Greenblum & Bernstein, P.L.C.

(57) ABSTRACT

Provided is a resin composition that, according to one embodiment, contains a (meth)acrylic copolymer (A), a polycarbonate-based resin (B), an ultraviolet absorber (C), and an antioxidant (D), the (meth)acrylic copolymer (A) containing 5-85% by mass of (meth)acrylate units (a) represented by general formula (1) and 15-95% by mass of methyl (meth)acrylate units (b), wherein the resin composition contains 0.1-1.5 parts by mass of (C) and 0.05-1.0 part by mass of (D) per 100 parts by mass of the resin component containing (A) and (B).

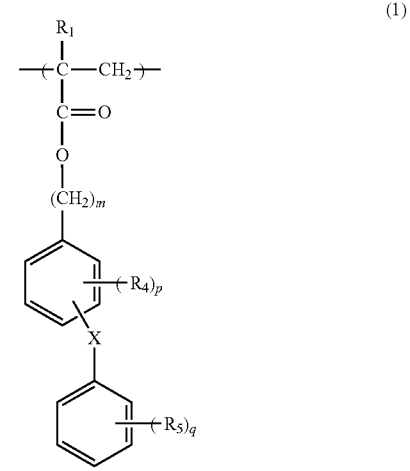

(1)

12 Claims, No Drawings

(56) References Cited

FOREIGN PATENT DOCUMENTS

| | | |
|---|---|---|
| JP | 2000-119262 | 4/2000 |
| JP | 2000-249989 | 9/2000 |
| JP | 2010-116501 | 5/2010 |
| JP | 2011-500914 | 1/2011 |
| JP | 2012-167195 | 9/2012 |
| JP | 2012-219159 | 11/2012 |
| JP | 2014-62148 | 4/2014 |
| JP | 5975194 | 7/2016 |
| WO | 2013/094898 | 6/2013 |
| WO | 2014/038500 | 3/2014 |
| WO | 2015/053145 | 4/2015 |
| WO | 2015/093516 | 6/2015 |

OTHER PUBLICATIONS

International Search Report issued in Patent Application No. PCT/JP2015/086075, dated Mar. 29, 2016.
European Search Report issued in European Application No. 15881231.3, dated Jun. 27, 2018.
Office Action from U.S. Appl. No. 14/917,110, dated Dec. 2, 2016.
Office Action from U.S. Appl. No. 14/917,110, dated Apr. 28, 2017.
Office Action from U.S. Appl. No. 14/917,110, dated Jan. 4, 2018.
Office Action from U.S. Appl. No. 15/535,580, dated Dec. 20, 2017.

* cited by examiner

POLYCARBONATE RESIN COMPOSITION AND ARTICLE MOLDED THEREFROM

TECHNICAL FIELD

The present invention relates to a polycarbonate resin composition and a molded body of the resin composition.

BACKGROUND ART

Polycarbonate-based resins are widely used in electric, electronic and office automation equipments, optical media, automotive parts, building components and the like because of excellent mechanical strength, heat resistance, electrical property, dimensional stability, flame retardance, transparency and the like thereof.

Such polycarbonate-based resins are usually produced by an interface method in which bisphenol A (aromatic dihydroxy compound) and phosgene are directly reacted with each other, a melting method in which bisphenol A and diphenyl carbonate (diester carbonate) are subjected to a transesterification reaction (polycondensation reaction) in a molten state, or the like.

However, a molded body obtained from a polycarbonate-based resin that is produced using bisphenol A as an aromatic dihydroxy compound comes short in terms of surface hardness, for example, for the application to automotive headlamps, spectacle lenses and outdoor use such as sheets.

For this reason, a hard coat layer or the like is often provided on the surface of the polycarbonate-based resin to enhance the surface hardness.

Forming a hard coat layer or the like on the surface, however, increases the number of steps of the production process, resulting in decrease of the production efficiency. Furthermore, in a case where a molded body has a complicated shape, it is difficult to form a hard coat layer.

Accordingly, a considerable number of researches on enhancing the surface hardness while maintaining the transparency by blending a specific resin into a polycarbonate-based resin have been done. There are many proposed cases in which an acrylic resin that is transparent like the polycarbonate-based resin is used as the resin to be blended into a polycarbonate-based resin. For example, Patent Documents 1 and 2 disclose resin compositions comprising a polycarbonate-based resin and an acrylic resin having a specific range of molecular weight.

In addition, some cases propose to blend an acrylic copolymer. For example, Patent Documents 3 to 8 disclose resin compositions comprising a polycarbonate-based resin and a (meth)acrylic copolymer.

PRIOR ART DOCUMENTS

Patent Documents

Patent Document 1: Japanese Laid-Open Patent Publication No. S62-131056
Patent Document 2: Japanese Laid-Open Patent Publication No. S63-139935
Patent Document 3: Japanese Laid-Open Patent Publication No. S64-1749
Patent Document 4: Japanese Laid-Open Patent Publication No. 2010-116501
Patent Document 5: Japanese Laid-Open Patent Publication No. H04-359954
Patent Document 6: National Publication of International Patent Application No. 2011-500914
Patent Document 7: International Publication WO2013/094898
Patent Document 8: Japanese Laid-Open Patent Publication No. 2014-62148

SUMMARY OF THE INVENTION

Problems to be Solved by the Invention

The resin compositions proposed in Patent Documents 1 to 7 have difficulty in providing both sufficient surface hardness and transparency to the molded product, or even if both surface hardness and transparency can be provided, there is a problem of deterioration of color phase and weather resistance after molding. Moreover, regarding the resin composition proposed in Patent Document 8, it is desired to further improve various properties thereof including those described above.

Accordingly, the objective of the present invention is to provide a resin composition, which can be molded into a molded body having excellent surface hardness and transparency, and which provides excellent color phase and weather resistance after molding.

Means for Solving the Problems

The present inventors diligently made researches in order to solve the above-described problems, and found that a resin composition containing a (meth)acrylate unit having a specific skeleton can be molded into a molded body having excellent surface hardness and transparency under a wide range of molding conditions, and that color phase and weather resistance after molding can be significantly improved by combined use of predetermined amounts of an ultraviolet absorber and an antioxidant, and thus the present invention was achieved. Specifically, the present invention is, for example, as follows:

[1] A resin composition, which comprises: a (meth)acrylic copolymer (A) containing 5 to 85% by mass of a (meth)acrylate unit (a) represented by general formula (1) below and 15 to 95% by mass of a methyl (meth)acrylate unit (b); a polycarbonate-based resin (B); an ultraviolet absorber (C); and an antioxidant (D), the resin composition containing 0.1 to 1.5 parts by mass of (C) and 0.05 to 1.0 part by mass of (D) per 100 parts by mass of a resin component containing (A) and (B):

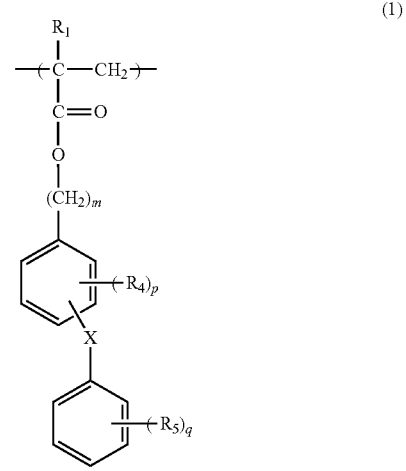

(1)

wherein:
X represents a single bond, or a divalent group selected from the group consisting of —C($R_2$)($R_3$)—, —C(=O)—, —O—, —OC(=O)O—, —S—, —SO—, —SO$_2$— and any combination thereof;

$R_1$ represents a hydrogen atom or a methyl group;

$R_2$ and $R_3$ each independently represent a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a phenylphenyl group, or $R_2$ and $R_3$ may be bonded to each other so as to form a cyclic alkyl group having 3 to 10 carbon atoms together with a carbon atom to which they are attached;

$R_4$ and $R_5$ each independently represent a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or phenylphenyl group;

m represents an integer of 1 to 10;

p represents an integer of 0 to 4; and q represents an integer of 0 to 5.

[2] The resin composition according to [1], wherein when the (meth)acrylic copolymer (A) is divided into a higher molecular weight region and a lower molecular weight region by setting a peak value of GPC elution curve as a boundary, the ratio ((L)/(H)×100%) of the mass percentage (L) of the (meth)acrylate unit (a) in the (meth)acrylic copolymer (A) belonging to the lower molecular weight region to the mass percentage (H) of the (meth)acrylate unit (a) in the (meth)acrylic copolymer (A) belonging to the higher molecular weight region is 80% to 120%.

[3] The resin composition according to [1] or [2], wherein the mass-average molecular weight of the (meth)acrylic copolymer (A) is 3,000 to 30,000.

[4] The resin composition according to any one of [1] to [3], wherein m in the general formula (1) represents an integer of 1 to 3.

[5] The resin composition according to any one of [1] to [4], wherein X in the general formula (1) represents a single bond, —C($R_2$)($R_3$)—, —C(=O)—, —O—, —SO— or —SO$_2$—.

[5-1] The resin composition according to any one of [1] to [5], wherein:

X represents a single bond, —C($R_2$)($R_3$)—, —C(=O)—, —O—, —SO— or —SO$_2$—;

$R_1$ represents a hydrogen atom or a methyl group;

$R_4$ and $R_5$ each independently represent a methyl group, a methoxy group, a chloro group, a bromo group or a phenyl group;

m represents an integer of 1 to 3;

p represents an integer of 0 to 1; and q represents an integer of 0 to 2.

[5-2] The resin composition according to any one of [1] to [5-1], wherein: the content of the (meth)acrylate unit (a) in the (meth)acrylic copolymer (A) is 5 to 80% by mass; and the content of the methyl (meth)acrylate unit (b) in the (meth)acrylic copolymer (A) is 20 to 95% by mass.

[6] The resin composition according to any one of [1] to [5-2], wherein p and q in the general formula (1) represent 0.

[7] The resin composition according to any one of [1] to [6], wherein the ultraviolet absorber (C) comprises at least one of a benzotriazole-based compound, a triazine-based compound and a benzoxazinone-based compound.

[7-1] The resin composition according to any one of [1] to [7], wherein the ultraviolet absorber (C) comprises a benzotriazole-based compound, and wherein the benzotriazole-based compound is 2-(2'-hydroxy-5'-tert-octylphenyl)benzotriazole or 2,2'-methylenebis[4-(1,1,3,3-tetramethylbutyl)-6-(2N-benzotriazole-2-yl)phenol].

[8] The resin composition according to any one of [1] to [7-1], wherein the blending amount of the ultraviolet absorber (C) is 0.3 to 0.6 parts by mass per 100 parts by mass of the resin component.

[9] The resin composition according to any one of [1] to [8], wherein the antioxidant (D) comprises a phenol-based antioxidant.

[9-1] The resin composition according to item [9], wherein the phenol-based antioxidant is pentaerythritoltetrakis[3-(3,5-di-tert-butyl-4-hydroxyphenyl)propionate] or octadecyl-3-(3,5-di-tert-butyl-4-hydroxyphenyl)propionate.

[10] The resin composition according to item [9] or [9-1], further comprising a phosphite-based antioxidant.

[10-1] The resin composition according to item [10], wherein the phosphite-based antioxidant is tris(2,4-di-tert-butylphenyl)phosphite, 2,2'-methylenebis(4,6-di-tert-butylphenyl)octylphosphite, bis(2,6-di-tert-butyl-4-methylphenyl)pentaerythritol diphosphite or bis(2,4-dicumylphenyl)pentaerythritol diphosphite.

[11] The resin composition according to any one of [1] to [10], wherein the blending amount of the antioxidant (D) is 0.1 to 0.5 parts by mass per 100 parts by mass of the resin component.

[12] The resin composition according to any one of [1] to [11], wherein the content of the (meth)acrylic copolymer (A) in the resin component is 5 to 60% by mass and the content of the polycarbonate-based resin (B) in the resin composition is 40 to 95% by mass.

[12-1] The resin composition according to any one of [1] to [12], wherein the haze of a plate test piece having a thickness of 1.5 mm, which is obtainable by melt-kneading the materials of the resin composition according to any one of [1] to [12] to be injection-molded at an injection temperature of 300° C., an injection speed of 300 mm/sec and a mold temperature of 80° C., is 12% or less.

[12-2] The resin composition according to item [12-1], wherein the pencil hardness of the plate test piece is HB or harder.

[12-3] The resin composition according to item [12-1] or [12-2], wherein the yellowness of the plate test piece is 4 or less.

[12-4] The resin composition according to any one of [12-1] to [12-3], wherein the yellowness of the plate test piece after subjected to a weathering test at 85° C. for 500 hours (without rain) is 30 or less.

[13] A molded body obtainable by molding the resin composition according to any one of [1] to [12-4].

[13-1] A molded body molded by using the resin composition according to any one of [1] to [12-4].

Advantageous Effect of the Invention

According to the present invention, it is possible to provide a resin composition, which can be molded into a molded body having excellent surface hardness and transparency under a wide range of molding conditions, and which realizes excellent color phase and weather resistance after molding. In particular, the resin composition improves the productivity because it can be subjected to injection molding at a high speed.

BEST MODE FOR CARRYING OUT THE INVENTION

Hereinafter, the embodiment of the present invention will be described in detail.

The resin composition of the embodiment is characterized in that it comprises: a (meth)acrylic copolymer (A) containing 5 to 85% by mass of a (meth)acrylate unit (a) represented by general formula (1) described below and 15 to 95% by mass of a methyl (meth)acrylate unit (b); a polycarbonate-based resin (B); an ultraviolet absorber (C); and an antioxidant (D), wherein the resin composition contains 0.1 to 1.5 parts by mass of (C) and 0.05 to 1.0 part by mass of (D) per 100 parts by mass of a resin component containing (A) and (B).

By using the resin composition of the present invention, it is possible to produce a molded body, which has excellent surface hardness because the (meth)acrylic copolymer is contained in the composition, wherein excellent transparency inherent in the polycarbonate-based resin is maintained.

As described above, in the case of resin compositions in which a polycarbonate-based resin of prior art is combined with another resin, transparency of a molded body tends to be deteriorated as the molding temperature increases (about 280° C. or higher) and further, in the case of injection molding, as the injection speed increases (about 150 mm/sec or higher). But the resin composition according to the embodiment, even when it is molded under high temperature conditions, and even when the injection speed is high in the injection molding, can provide a molded body having excellent transparency.

It is not known exactly why a molded product having high transparency can be obtained as described above, but a benzene ring of an ester moiety in a (meth)acrylate unit (a) represented by general formula (1) described later seems to have an action of enhancing the transparency of the molded body. In particular, a (meth)acrylate unit having two or more benzene rings has good compatibility with a polycarbonate-based resin (B) and therefore seems to be capable of maintaining the transparency of the molded body under a wide range of molding conditions.

Furthermore, the (meth)acrylate unit (a) represented by general formula (1) described later is almost uniformly introduced into the (meth)acrylic copolymer (A) constituting the resin composition according to the embodiment. This phenomenon occurs regardless of the molecular weight of the (meth)acrylic copolymer (A) (see the Examples described later). Since such a structural unit that has excellent compatibility with the polycarbonate-based resin (B) is uniformly present in the (meth)acrylic copolymer (A), the haze can be reduced even when the (meth)acrylic copolymer (A) is mixed with the polycarbonate-based resin (B), and this seems to contribute to high transparency of the molded product.

Meanwhile, excellent surface hardness of the resin composition according to the embodiment seems to result from the fact that a certain amount of the methyl (meth)acrylate unit (b) that is superior in terms of surface hardness is blended. This effect can also be obtained regardless of the molding conditions thereof. Accordingly, the resin composition according to the embodiment can be molded into a molded product that has both high transparency and high surface hardness under a wide range of conditions. Since an excellent molded product can be obtained under a wide range of conditions, a molded product can be produced efficiently and inexpensively. The resin composition according to the embodiment can be used in a wide range of fields, for example, applications that require transparency such as materials for optical media and applications that require color developing property such as chassis.

In addition, since the resin composition according to the embodiment contains predetermined amounts of an ultraviolet absorber and an antioxidant, it is possible to obtain a molded body having excellent color phase and weather resistance. The ultraviolet absorber can suppress deterioration and color change of the resin caused by ultraviolet light that has an energy greater than the bond dissociation energy of the organic compound. Specifically, the ultraviolet absorber absorbs ultraviolet light before deterioration and/or color change of the resin is caused by ultraviolet light to convert light energy to thermal energy, thereby suppressing deterioration and color change of the resin. Meanwhile, the antioxidant can suppress deterioration and/or color change of the resin caused by free radicals such as peroxy radical generated when the resin is attacked by heat and oxygen. Specifically, the antioxidant traps and decomposes free radicals such as peroxy radical, thereby suppressing deterioration and color change of the resin.

In this regard, "excellent color phase" means less colored, that is, low yellowness.

Hereinafter, each component contained in the resin composition according to the embodiment will be described.

[1] (meth)acrylic Copolymer (A)

The (meth)acrylic copolymer (A) that is a component of the resin composition according to the embodiment contains a (meth)acrylate unit (a) represented by general formula (1) described below and a methyl (meth)acrylate unit (b). Hereinafter, each of them will be described.

(1) (meth)acrylate Unit (a)

The (meth)acrylate unit (a) is represented by general formula (1) below. Herein, an acrylate unit and a methacrylate unit are collectively referred to as a (meth)acrylate unit.

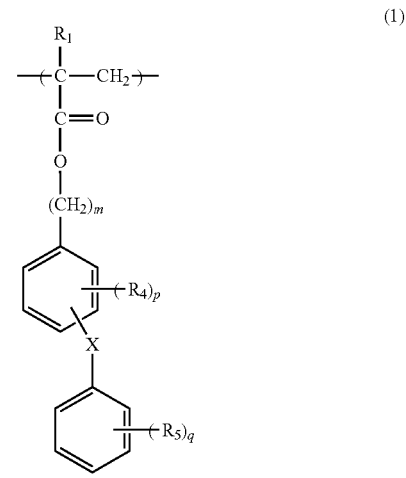

The (meth)acrylate unit (a) represented by general formula (1) has two or more benzene rings in the ester moiety, and has a structural feature in that the oxygen atom and the benzene rings are not directly bonded in the ester moiety. Since the (meth)acrylate unit (a) has good compatibility with the polycarbonate-based resin (B), it contributes to the improvement of transparency of a molded body obtained.

In general formula (1) above, $R_1$ represents a hydrogen atom or a methyl group, and preferably a methyl group.

X represents a single bond, or a divalent group selected from the group consisting of —C($R_2$)($R_3$)—, —C(=O)—, —O—, —OC(=O)—, —OC(=O)O—, —S—, —SO—, —$SO_2$— and any combination thereof. $R_2$ and $R_3$ each independently represent a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a phenylphenyl group. These may have a substituent, and examples of the substituent include a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms and a halogen atom.

X preferably represents a single bond, —C($R_2$)($R_3$)—, —C(=O)—, —O—, —SO— or —$SO_2$—, and more preferably a single bond, —C($R_2$)($R_3$)—, —O— or —$SO_2$—. $R_2$ and $R_3$ are each independently selected preferably from a hydrogen atom, a methyl group, a methoxy group, a phenyl group and a phenylphenyl group, and more preferably a hydrogen atom.

$R_2$ and $R_3$ may be bonded to each other so as to form a cyclic alkyl group having 3 to 10 carbon atoms together with a carbon atom to which they are attached.

$R_4$ and $R_5$ each independently represent a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or a phenylphenyl group. These may have a substituent, and examples of the substituent include a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms and a halogen atom.

$R_4$ and $R_5$ are each independently selected preferably from a methyl group, a methoxy group, a chloro group, a bromo group and a phenyl group, and more preferably a phenyl group.

m represents an integer of 1 to 10, preferably an integer of 1 to 3, and more preferably 1.

p represents an integer of 0 to 4, preferably an integer of 0 to 1, and more preferably 0.

q represents an integer of 0 to 5, preferably an integer of 0 to 2, and more preferably 0.

Examples of the (meth)acrylate compound represented by general formula (1) above include 4-phenylbenzyl(meth)acrylate, 3-phenylbenzyl(meth)acrylate, 2-phenylbenzyl(meth)acrylate, 4-biphenylbenzyl(meth)acrylate, 3-biphenylbenzyl(meth)acrylate, 2-biphenylbenzyl(meth)acrylate, 4-benzylbenzyl(meth)acrylate, 3-benzylbenzyl(meth)acrylate, 2-benzylbenzyl(meth)acrylate, 4-phenethylbenzyl(meth)acrylate, 3-phenethylbenzyl(meth)acrylate, 2-phenethylbenzyl(meth)acrylate, 4-phenethylphenethyl(meth)acrylate, 3-phenethylphenethyl(meth)acrylate, 2-phenethylphenethyl(meth)acrylate, 4-(4-methylphenyl) benzyl(meth)acrylate, 3-(4-methylphenyl)benzyl(meth) acrylate, 2-(4-methylphenyl)benzyl(meth)acrylate, 4-(4-methoxyphenyl)benzyl(meth)acrylate, 3-(4-methoxyphenyl)benzyl(meth)acrylate, 2-(4-methoxyphenyl)benzyl(meth)acrylate, 4-(4-bromophenyl) benzyl(meth)acrylate, 3-(4-bromophenyl)benzyl(meth)acrylate, 2-(4-bromophenyl)benzyl(meth)acrylate, 4-benzoylbenzyl(meth)acrylate, 3-benzoylbenzyl(meth)acrylate, 2-benzoylbenzyl(meth)acrylate, 4-(phenylsulfinyl)benzyl(meth)acrylate, 3-(phenylsulfinyl)benzyl(meth)acrylate, 2-(phenylsulfinyl)benzyl(meth)acrylate, 4-(phenylsulfonyl)benzyl(meth)acrylate, 3-(phenylsulfonyl)benzyl(meth)acrylate, 2-(phenylsulfonyl)benzyl(meth)acrylate, 4-((phenoxycarbonyl)oxy)benzyl(meth)acrylate, 3-((phenoxycarbonyl)oxy)benzyl(meth)acrylate, 2-((phenoxycarbonyl)oxy)benzyl(meth)acrylate, 4-(((meth)acryloxy)methyl)phenyl benzoate, 3-(((meth)acryloxy)methyl) phenyl benzoate, 2-(((meth)acryloxy)methyl)phenyl benzoate, phenyl 4-(((meth)acryloxy)methyl)benzoate, phenyl 3-(((meth)acryloxy)methyl)benzoate, phenyl 2-(((meth)acryloxy)methyl)benzoate, 4-(1-phenylcyclohexyl)benzyl(meth)acrylate, 3-(1-phenylcyclohexyl)benzyl(meth)acrylate, 2-(1-phenylcyclohexyl)benzyl(meth)acrylate, 4-phenoxybenzyl(meth)acrylate, 3-phenoxybenzyl(meth)acrylate, 2-phenoxybenzyl(meth)acrylate, 4-(phenylthio)benzyl(meth)acrylate, 3-(phenylthio)benzyl(meth)acrylate, 2-(phenylthio)benzyl(meth)acrylate and 3-methyl-4-(2-methylphenyl)benzylmethacrylate. These compounds may be used solely, or two or more of them may be used in combination. Among them, preferred are 4-phenylbenzyl(meth)acrylate, 3-phenylbenzyl(meth)acrylate, 2-phenylbenzyl(meth)acrylate, 4-biphenylbenzyl(meth)acrylate, 3-biphenylbenzyl(meth)acrylate and 2-biphenylbenzyl(meth)acrylate, and more preferred are 4-phenylbenzyl(meth)acrylate, 3-phenylbenzyl(meth)acrylate, 2-phenylbenzyl(meth)acrylate, 4-benzylbenzyl(meth)acrylate, 4-phenoxybenzyl(meth)acrylate and 4-(phenylsulfonyl)benzyl(meth)acrylate.

(2) Methyl (meth)acrylate Unit (b)

The (meth)acrylic copolymer (A) further comprises the methyl (meth)acrylate unit (b). A monomer constituting the methyl (meth)acrylate unit (b) is methyl (meth)acrylate. Herein, a methyl acrylate unit and a methyl methacrylate unit are collectively referred to as a methyl (meth)acrylate unit. As the methyl (meth)acrylate unit (b), a publicly-known monomer can be used. Since the methyl (meth) acrylate unit (b) has good dispersibility in the polycarbonate-based resin (B), it has a capacity to enhance the surface hardness of molded bodies.

Preferably, the methyl (meth)acrylate unit (b) is either the methyl methacrylate unit or a combination of the methyl methacrylate unit and the methyl acrylate unit.

Next, the (meth)acrylic copolymer (A) will be described.

The (meth)acrylic copolymer (A) contains 5 to 85% by mass of the (meth)acrylate unit (a) represented by general formula (1) and 15 to 95% by mass of the methyl (meth) acrylate unit (b) relative to the copolymer. The ratio of the (meth)acrylate unit (a) in the (meth)acrylic copolymer (A) is preferably 5% by mass or more from the viewpoint of transparency. Meanwhile, when the (meth)acrylate unit (a) having benzene rings in the ester moiety is copolymerized, the molded body of the (meth)acrylic copolymer (A) tends to have lower surface hardness such as the pencil hardness. However, when the ratio of the methyl (meth)acrylate unit (b) is 15% by mass or more, the molded body of the (meth)acrylic copolymer (A) will have sufficient surface hardness. Therefore, by molding a resin composition obtained by melt-kneading this (meth)acrylic copolymer (A) and the polycarbonate-based resin (B) with relatively low surface hardness, a molded body having better surface hardness than the case of the polycarbonate-based resin (B) alone can be obtained.

The ratio of the (meth)acrylate unit (a) in the (meth) acrylic copolymer (A) is preferably 5 to 80% by mass, and more preferably 10 to 40% by mass. In addition, the ratio of the methyl (meth)acrylate unit (b) in the (meth)acrylic copolymer (A) is preferably 20 to 95% by mass, and more preferably 60 to 90% by mass.

The present inventors also found that the (meth)acrylic copolymer (A) has the property in that the (meth)acrylate unit (a) is almost homogeneously introduced therein regardless of the polymerization method and the molecular weight thereof. When the (meth)acrylic copolymer (A) is divided into a higher molecular weight region and a lower molecular weight region by setting a peak value of GPC elution curve as a boundary, the ratio ((L)/(H)×100%) of the mass percentage (L) of the (meth)acrylate unit (a) in the (meth) acrylic copolymer (A) belonging to the lower molecular weight region to the mass percentage (H) of the (meth) acrylate unit (a) in the (meth)acrylic copolymer (A) belonging to the higher molecular weight region is near 100%. This value is preferably in a range of 80% to 120%, and more preferably in a range of 85% to 115%. When the above-described value is near 100%, it means that a nearly equal amount of the (meth)acrylate unit (a) is introduced into each of the lower molecular weight region and the higher molecular weight region of the (meth)acrylic copolymer (A).

As described above, the (meth)acrylate unit (a) appears to contribute to the improvement of the compatibility between the (meth)acrylic copolymer (A) and the polycarbonate-based resin (B). Therefore, when the (meth)acrylate unit (a) homogeneously exists in the (meth)acrylic copolymer (A), it is inferred that the compatibility between the (meth)acrylic copolymer (A) and the polycarbonate-based resin (B) can be further improved, leading to the improvement of the transparency of the molded body obtained.

As to the method for determining the mass percentage (H) of the (meth)acrylate unit (a) in the higher molecular weight region and the mass percentage (L) of the (meth)acrylate unit (a) in the lower molecular weight region, see the Examples described below.

The mass-average molecular weight of the (meth)acrylic copolymer (A) is preferably 3,000 to 30,000, more preferably 5,000 to 20,000 and particularly preferably 8,000 to 14,000. When the mass-average molecular weight is 3,000 to 30,000, good compatibility with the polycarbonate-based resin (B) is obtained, and it is preferred in terms of transparency and surface hardness of the molded body. When the mass-average molecular weight is 30,000 or more, the (meth)acrylic copolymer (A) can easily aggregate, for example, when being sheared upon molding, and as a result, transparency of the molded body obtained tends to be deteriorated. Meanwhile, when the mass-average molecular weight is 3,000 or less, the mechanical physical properties such as impact resistance and pencil hardness of the molded body obtained tends to be deteriorated.

Note that the mass-average molecular weight (Mw), the number average molecular weight (Mn) and the molecular weight distribution (Mw/Mn) of the (meth)acrylic copolymer (A) can be measured using gel permeation chromatography.

The (meth)acrylic copolymer (A) may also be produced optionally by further copolymerizing another monomer (hereinafter referred to as component (c)), according to need. The component (c) is not particularly limited as long as it does not have adverse effect on the properties of the resin composition, and examples thereof include: methacrylates such as ethyl methacrylate, butyl methacrylate, propyl methacrylate and 2-ethylhexyl methacrylate; acrylates such as ethyl acrylate, butyl acrylate, propyl acrylate, 2-ethylhexyl acrylate and glycidyl acrylate; vinyl cyanide monomers such as acrylonitrile and methacrylonitrile; dienic monomers such as butadiene, isoprene and dimethyl butadiene; vinyl ether-based monomers such as vinyl methyl ether and vinyl ethyl ether; carboxylic-acid-based vinyl monomers such as vinyl acetate and vinyl butyrate; olefinic monomers such as ethylene, propylene and isobutylene; ethylenic unsaturated carboxylic acid monomers such as acrylic acid, methacrylic acid, maleic acid and itaconic acid; halogenated vinyl monomers such as vinyl chloride and vinylidene chloride; maleimide-based monomers such as maleimide, N-phenylmaleimide, N-cyclohexylmaleimide and N-methylmaleimide; and crosslinking agents such as allyl (meth)acrylate, divinylbenzene and 1,3-buthylenedimethacrylate. Among them, methacrylate, acrylate and a vinyl cyanide monomer are preferable; and acrylate is more preferable in terms of preventing thermal decomposition of the (meth)acrylic copolymer (A). These monomers may be used solely, or two or more of them may be used in combination.

When the above-described another monomer as the component (c) is contained, it is contained in an amount of preferably 0.1 to 10% by mass, more preferably 0.1 to 5% by mass, and particularly preferably 0.1 to 3% by mass relative to the (meth)acrylic copolymer (A). It is most preferred that the (meth)acrylic copolymer (A) contains 5 to 79.9% by mass of the (meth)acrylate unit (a), 20 to 94.9% by mass of the methyl (meth)acrylate unit (b) and 0.1 to 10% by mass of the another component (c).

When the content of the component (c) is 0.1% by mass or more, heat decomposition of the (meth)acrylic copolymer (A) can be suppressed, and when the content is 10% by mass or less, it does not adversely affect the surface hardness and transparency of the molded body.

The polymerization method for obtaining the (meth) acrylic copolymer (A) is not particularly limited and a publicly-known method such as emulsion polymerization, suspension polymerization, solution polymerization and block polymerization may be employed. Suspension polymerization and block polymerization are preferable while suspension polymerization is more preferable. Moreover, additives and the like which are required for polymerization can be suitably added according to need. Examples of such additives include a polymerization initiator, an emulsifier, a dispersant and a chain transfer agent.

The polymerization temperature is preferably 50° C. to 150° C., and more preferably 70° C. to 130° C., which may vary depending on the composition of (meth)acrylate monomer and the additives such as the polymerization initiator. The polymerization may be carried out by increasing the temperature in a multi-step manner.

Although the polymerization time may vary depending on the polymerization method, the composition of (meth)acrylate monomer and the additives such as the polymerization initiator, it is preferably 1 to 8 hours, and more preferably 2 to 6 hours at the intended temperature. The time that takes to reach the intended temperature should further be added to this polymerization time.

Although the reaction pressure may vary depending on the polymerization method, the composition of (meth)acrylate monomer and the like, the polymerization is carried out preferably at a reaction pressure of ordinary pressure to 3 MPa, and more preferably at a reaction pressure of ordinary pressure to 1 MPa.

[2] Polycarbonate-based Resin (B)

The resin composition according to the embodiment comprises a polycarbonate-based resin (B).

The polycarbonate-based resin (B) is not particularly limited as long as it contains a carbonate bond in the main chain of the molecule, i.e., it has a —[O—R—OCO]— unit. R in the formula may represent any of an aliphatic group, an aromatic group, and both aliphatic and aromatic groups. Among them, aromatic polycarbonate that is obtained using an aromatic dihydroxy compound such as bisphenol A is favorable in terms of the cost. Further, these polycarbonate-based resins may be used solely, or two or more of them may be used in combination.

The viscosity-average molecular weight (Mv) of the polycarbonate-based resin (B) can be calculated by a viscosity measurement method, which is preferably 15,000 to 30,000 and more preferably 17,000 to 25,000. As long as the viscosity-average molecular weight is within the above-mentioned range, a molded body having good compatibility with the (meth)acrylic copolymer (A) and better transparency and surface hardness can be obtained.

The method for producing the polycarbonate-based resin (B) can be suitably selected depending on the monomer used as the raw material. Examples thereof include the phosgene method and the transesterification method. Alternatively, a product that is available on the market can also be used. For example, Iupilon (registered trademark) S-3000 (manufactured by Mitsubishi Engineering-Plastics Corporation, Mv=22,000), Tarflon (registered trademark) FN1700 (manufactured by Idemitsu Kosan Co., Ltd., Mv=18,000) or the like can be used.

A resin component in the resin composition according to the embodiment preferably contains 5 to 60% by mass of the (meth)acrylic copolymer (A) and 40 to 95% by mass of the polycarbonate-based resin (B) (based on the total mass of respective resin components). In this regard, the total of all resins contained in the resin composition according to the embodiment is referred to as the "resin component", and the "resin component" consists of the (meth)acrylic copolymer (A) and the polycarbonate-based resin (B), and optionally a resin (R) described below. Further, the resin component more preferably contains 10 to 50% by mass of the (meth) acrylic copolymer (A) and 50 to 90% by mass of the polycarbonate-based resin (B) (based on the total mass of respective resin components). When the content of the (meth)acrylic copolymer (A) in the resin component is 5% by mass or more, the compatibility between the (meth) acrylic copolymer (A) and the polycarbonate-based resin (B) and the flowability can be improved. Meanwhile, the haze tends to increase when the content of the (meth)acrylic copolymer (A) is too much, but deterioration of the transparency of the molded body obtained can be suppressed as long as the content of the (meth)acrylic copolymer (A) is 60% by mass or less.

The resin component in the resin composition may also contain another resin (R) other than the (meth)acrylic copolymer (A) and the polycarbonate-based resin (B) to an extent that does not inhibit the effect of the present invention.

Examples of such resin (R) include: polystyrene-based resins such as ABS, HIPS, PS and PAS; polyester-based resins such as polyethylene terephthalate and polybutylene terephthalate, for the improvement of chemical resistance, etc.; polyolefin-based resins; and polymer alloys such as elastomers that are blended with other thermoplastic resins. The content of such resin is preferably within a range that does not impair the physical properties such as heat resistance, impact resistance and flame retardance that are inherent in the polycarbonate-based resin (B). The resin (R) is contained in the resin component at a ratio of preferably 0 to 50% by mass, more preferably 0 to 30% by mass, and even more preferably 0 to 10% by mass.

[3] Ultraviolet Absorber (C)

The resin composition according to the embodiment comprises an ultraviolet absorber (C).

Examples of the ultraviolet absorber (C) include: inorganic ultraviolet absorbers such as cerium oxide and zinc oxide; and organic ultraviolet absorbers such as a benzotriazole-based compound, a benzophenone-based compound, a salicylate-based compound, a cyanoacrylate-based compound, a triazine-based compound, an oxanilide-based compound, a malonic acid ester compound, a hindered amine-based compound, an anilide oxalate-based compound and a benzoxazinone-based compound. Among them, preferred are organic ultraviolet absorbers, more preferred is a benzotriazole-based compound, a triazine-based compound or a benzoxazinone-based compound, and particularly preferred is a benzotriazole-based compound (a compound having the benzotriazole structure).

Specific examples of the benzotriazole-based compound include 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole, 2-(2'-hydroxy-3',5'-di-tert-amyl)-benzotriazole, 2-(2'-hydroxy-5'-tert-octylphenyl)benzotriazole and 2,2'-methylenebis[4-(1,1,3,3-tetramethylbutyl)-6-(2N-benzotriazole-2-yl)phenol]. Among them, preferred are 2-(2'-hydroxy-5'-tert-octylphenyl)benzotriazole and 2,2'-methylenebis[4-(1,1,3,3-tetramethylbutyl)-6-(2N-benzotriazole-2-yl)phenol], and particularly preferred is 2-(2'-hydroxy-5'-tert-octylphenyl)benzotriazole. As such benzotriazole-based compounds, for example, "Seesorb 701", "Seesorb 705", "Seesorb 703", "Seesorb 702", "Seesorb 704" and "Seesorb 709" manufactured by Shipro Kasei Kaisha Ltd.; "Biosorb 520", "Biosorb 582", "Biosorb 580" and "Biosorb 583" manufactured by Kyodo Chemical Co., Ltd.; "Chemisorb 71" and "Chemisorb 72" manufactured by Chemipro Kasei Kaisha, Ltd.; "Cyasorb UV5411" manufactured by Cytec Industries Inc.; "LA-32", "LA-38", "LA-36", "LA-34" and "LA-31" manufactured by ADEKA Corporation; "Tinuvin P", "Tinuvin 234", "Tinuvin 326", "Tinuvin 327" and "Tinuvin 328" manufactured by Ciba Specialty Chemicals Inc.; etc. are available.

Specific examples of the benzophenone-based compound include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-n-dodecyloxybenzophenone, bis(5-benzoyl-4-hydroxy-2-methoxyphenyl)methane, 2,2'-dihydroxy-4-methoxybenzophenone and 2,2'-dihydroxy-4,4'-dimethoxybenzophenone. As such benzophenone-based compounds, for example, "Seesorb 100", "Seesorb 101", "Seesorb 101S", "Seesorb 102" and "Seesorb 103" manufactured by Shipro Kasei Kaisha Ltd.; "Biosorb 100", "Biosorb 110" and "Biosorb 130" manufactured by Kyodo Chemical Co., Ltd.; "Chemisorb 10", "Chemisorb 11", "Chemisorb 11S", "Chemisorb 12", "Chemisorb 13" and "Chemisorb 111" manufactured by Chemipro Kasei Kaisha, Ltd.; "Uvinul 400" manufactured by BASF; "Uvinul M-40" manufactured by BASF; "Uvinul MS-40" manufactured by BASF; "Cyasorb UV9", "Cyasorb UV284", "Cyasorb UV531" and "Cyasorb UV24" manufactured by Cytec Industries Inc.; "ADEKA STAB 1413" and "ADEKA STAB LA-51" manufactured by ADEKA Corporation; etc. are available.

Specific examples of the salicylate-based compound include phenyl salicylate and 4-tert-butylphenyl salicylate. As such salicylate-based compounds, for example, "Seesorb 201" and "Seesorb 202" manufactured by Shipro Kasei Kaisha Ltd.; "Chemisorb 21" and "Chemisorb 22" manufactured by Chemipro Kasei Kaisha, Ltd.; etc. are available.

Specific examples of the cyanoacrylate-based compound include ethyl-2-cyano-3,3-diphenyl acrylate and 2-ethylhexyl-2-cyano-3,3-diphenylacrylate. As such cyanoacrylate-based compounds, for example, "Seesorb 501" manufactured by Shipro Kasei Kaisha Ltd.; "Biosorb 910" manufactured by Kyodo Chemical Co., Ltd.; "Uvisolator 300" manufactured by Daiichi Kasei Co., Ltd.; "Uvinul N-35" and "Uvinul N-539" manufactured by BASF; etc. are available.

Specific examples of the oxanilide-based compound include 2-ethoxy-2'-ethyl oxanilic acid bisanilide. As such oxanilide-based compounds, for example, "Sanduvor VSU" manufactured by Clariant, etc. are available.

As the malonic acid ester compound, 2-(alkylidene)malonic acid esters are preferred, and 2-(1-arylalkylidene) malonic acid esters are more preferred. As such malonic acid ester compounds, for example, "PR-25" manufactured by Clariant (Japan) K.K. and "B-CAP" manufactured by Ciba Specialty Chemicals Inc. are available.

Examples of the triazine-based compound include 2,4-bis[2-hydroxy-4-butoxyphenyl]-6-(2,4-dibutoxyphenyl)-1,3,5-triazine, 2-(2-hydroxy-4-[1-octyloxycarbonylethoxy]phenyl)-4,6-bis(4-phenylphenyl)-1,3,5-triazine, 2-(4,6-diphenyl-1,3,5-triazine-2-yl)-5-[2-(2-ethylhexanoyloxy)ethoxy]-phenol, 2-[4,6-bis(2,4-dimethylphenyl)-1,3,5-triazine-2-yl]-5-(octyloxy)phenol, 2-(4,6-diphenyl-1,3,5-triazine-2-yl)-5-[(hexyl)oxy]-phenol and 2,4,6-tris(2-hydroxy-4-hexyoxy-3-methylphenyl)-1,3,5-triazine. As such triazine-based compounds, "ADEKA STAB LA-46" and "ADEKA STAB LA-F70" manufactured by ADEKA Corporation; "Tinuvin 460", "Tinuvin 479" and "Tinuvin 1577" manufactured by BASF; "Cyasorb UV1164" manufactured by Cytec Industries Inc.; etc. are available.

The blending amount of the ultraviolet absorber (C) is 0.1 to 1.5 parts by mass, preferably 0.2 to 1.0 parts by mass, more preferably 0.3 to 1.0 parts by mass, and particularly preferably 0.3 to 0.6 parts by mass per 100 parts by mass of the resin component which contains the (meth)acrylic copolymer (A) comprising 5 to 85% by mass of the (meth) acrylate unit (a) represented by general formula (1) above and 15 to 95% by mass of the methyl (meth)acrylate unit (b) and the polycarbonate-based resin (B).

When the blending amount is 0.1 parts by mass or more, weather resistance tends to be sufficiently exerted. When the blending amount is 1.5 parts by mass or less, the amount of outgas at the time of molding can be suppressed, and the problem of mold contamination is less likely to occur.

Only one type of the ultraviolet absorber may be contained, or two or more types of ultraviolet absorbers may be contained with any combination and ratio.

[4] Antioxidant (D)

The resin composition according to the embodiment comprises an antioxidant (D).

Examples of the antioxidant (D) include a phenol-based antioxidant, an amine-based antioxidant, a phosphite-based antioxidant and a thioether-based antioxidant. Only one type of an antioxidant may be contained, or two or more types of antioxidants may be contained with any combination and ratio. Among them, use of the phenol-based antioxidant or combined use of the phenol-based antioxidant and the phosphite-based antioxidant is preferred.

Specific examples of the phenol-based antioxidant include pentaerythritol tetrakis[3-(3,5-di-tert-butyl-4-hydroxyphenyl)propionate], octadecyl-3-(3,5-di-tert-butyl-4-hydroxyphenyl)propionate, thiodiethylene bis[3-(3,5-di-tert-butyl-4-hydroxyphenyl)propionate], N,N'-hexane-1,6-diyl bis[3-(3,5-di-tert-butyl-4-hydroxyphenylpropionamide), 2,4-dimethyl-6-(1-methylpentadecyl)phenol, diethyl[[3,5-bis(1,1-dimethylethyl)-4-hydroxyphenyl]methyl]phosphoate, 3,3',3",5,5',5"-hexa-tert-butyl-a,a',a"-(mesitylene-2,4,6-triyl)tri-p-cresol, 4,6-bis(octylthiomethyl)-o-cresol, ethylene bis(oxyethylene)bis[3-(5-tert-butyl-4-hydroxy-m-tolyl)propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, and 2,6-di-tert-butyl-4-(4,6-bis(octylthio)-1,3,5-triazine-2-ylamino)phenol.

Among them, pentaerythritol tetrakis[3-(3,5-di-tert-butyl-4-hydroxyphenyl)propionate] and octadecyl-3-(3,5-di-tert-butyl-4-hydroxyphenyl)propionate are preferred. As such phenol-based antioxidants, for example, "Irganox 1010" and "Irganox 1076" manufactured by Ciba; "ADEKA STAB AO-50" and "ADEKA STAB AO-60" manufactured by ADEKA Corporation; etc. are available.

Specific examples of the phosphite-based antioxidant include triphenyl phosphite, tris(nonylphenyl)phosphite, dilaurylhydrogen phosphite, triethyl phosphite, tridecyl phosphite, tris(2-ethylhexyl)phosphite, tris(tridecyl)phosphite, tristearyl phosphite, diphenyl monodecyl phosphite, monophenyl didecyl phosphite, diphenyl mono(tridecyl) phosphite, tetraphenyldipropylene glycol diphosphite, tetraphenyltetra(tridecyl)pentaerythritol tetraphosphite, hydrogenated bisphenol A phenol phosphite polymer, diphenylhydrogen phosphite, 4,4'-butylidene-bis(3-methyl-6-tert-butylphenyldi(tridecyl)phosphite), tetra(tridecyl)4,4'-isopropylidenediphenyl diphosphite, bis(tridecyl)pentaerythritol diphosphite, bis(nonylphenyl)pentaerythritol diphosphite, dilaurylpentaerythritol diphosphite, distearylpentaerythritol diphosphite, tris(4-tert-butylphenyl)phosphite, tris(2,4-di-tert-butylphenyl)phosphite, hydrogenated bisphenol A pentaerythritol phosphite polymer, bis(2,4-di-tert-butylphenyl)pentaerythritol diphosphite, bis(2,6-di-tert-butyl-4-methylphenyl)pentaerythritol diphosphite, 2,2'-methylenebis(4,6-di-tert-butylphenyl)octyl phosphite, and bis(2,4-dicumylphenyl)pentaerythritol diphosphite.

Among them, tris(2,4-di-tert-butylphenyl)phosphite, 2,2'-methylenebis(4,6-di-tert-butylphenyl)octyl phosphite, bis(2,6-di-tert-butyl-4-methylphenyl)pentaerythritol diphosphite and bis(2,4-dicumylphenyl)pentaerythritol diphosphite are preferred. As such phosphite-based antioxidants, for example, "ADEKA STAB 2112", "ADEKA STAB HP-10" and "ADEKA STAB PEP36" manufactured by ADEKA Corporation; "Doverphos S-9228" manufactured by Dover Chemical Corporation; etc. are available.

Specific examples of the amine-based antioxidant include aromatic amines such as poly(2,2,4-trimethyl-1,2-dihydroquinoline), 6-ethoxy-1,2-dihydro-2,2,4-trimethylquinoline, phenyl-α-naphthylamine, 4,4-bis(α,α-dimethylbenzyl)diphenylamine, (p-toluenesulfonylamido)diphenylamine, N,N'-diphenyl-p-phenylenediamine, N,N'-di-β-naphthyl-p-phenylenediamine, N,N'-di(1,4-dimethylpentyl)-p-phenylenediamine, N-phenyl-N'-isopropyl-p-phenylenediamine, N-phenyl-N'-1,3-dimethylbutyl-p-phenylenediamine and N-(1-methylheptyl)-N'-phenyl-p-phenylenediamine.

Specific examples of the thioether-based antioxidant include pentaerythrityl tetrakis(3-laurylthiopropionate), dilauryl-3,3'-thiodipropionate, dimyristyl-3,3'-thiodipropionate and distearyl-3,3'-thiodipropionate.

The blending amount of the antioxidant (D) is 0.05 to 1.0 parts by mass, preferably 0.05 to 0.8 parts by mass, more preferably 0.1 to 0.5 parts by mass, and particularly preferably 0.2 to 0.4 parts by mass per 100 parts by mass of the resin component which contains the (meth)acrylic copolymer (A) comprising 5 to 85% by mass of the (meth)acrylate unit (a) represented by general formula (1) above and 15 to 95% by mass of the methyl (meth)acrylate unit (b) and the polycarbonate-based resin (B).

When the content of the antioxidant is 0.05 parts by mass or more, effects as the antioxidant tend to be sufficiently exerted. When the content of the antioxidant is 1.0 parts by mass or less, it tends to be economical because excessive addition not worth the effects that has leveled off can be suppressed.

The resin composition according to the embodiment may also contain an additive or the like according to need to an extent that does not inhibit the effect of the present invention.

Examples of the additive that can be contained in the above-described resin composition include a stabilizer, a strengthening agent, a weather proofing agent, an inorganic filler, an impact resistance modifying agent, a flame retardant, an antistatic agent, a mold release agent, a pigment and fluoroolefin. Specifically, talc, mica, calcium carbonate, glass fiber, carbon fiber, potassium titanate fiber or the like may be used in order to improve the strength, the stiffness, the flame retardance or the like of the molded body. In addition, a rubber-like elastic body having a bilayer core-shell structure for improving the impact resistance, or the like may also be contained.

The resin composition according to the embodiment can be produced by a method in which the (meth)acrylic copolymer (A), the polycarbonate-based resin (B), the ultraviolet absorber (C) and the antioxidant (D) are mixed in a powdered state or a method in which they are melted by heating and kneaded. For such mixing, for example, a Henschel mixer, a Bunbury mixer, a single-screw-type extruder, a twin-screw-type extruder, a two spindle roller, a kneader, a Brabender or the like can be used.

[5] Molded Body

According to one embodiment, a molded body obtained by molding the above-described resin composition is provided.

The resin composition according to the embodiment is capable of providing a molded body that has both excellent transparency and surface hardness even when molded under high temperature conditions. For example, the haze of a plate test piece having a thickness of 1.5 mm, which is obtained by melt-kneading a material comprising: 100 parts by mass of the resin component containing the (meth)acrylic copolymer (A) and the polycarbonate-based resin (B) (viscosity-average molecular weight: 22,000) at a ratio of 30/70 (% by mass); 0.1 to 1.5 parts by mass of the ultraviolet absorber; and 0.05 to 1.0 parts by mass of the antioxidant and subjecting the resultant to injection molding at an injection temperature of 300° C., an injection speed of 300 mm/sec and a mold temperature of 80° C., is preferably 12% or lower, more preferably 10% or lower, and particularly preferably 5% or lower. Further, the pencil hardness of the above-described plate test piece is preferably HB or harder, and more preferably F or harder.

Moreover, the molded body obtained by injection-molding the resin composition according to the embodiment has low yellowness, and the yellowing degree after the weathering test was low. For example, the yellowness of a plate test piece having a thickness of 1.5 mm, which is obtained by melt-kneading a material comprising: 100 parts by mass of the resin component containing the (meth)acrylic copolymer (A) and the polycarbonate-based resin (B) (viscosity-average molecular weight: 22,000) at a ratio of 30/70 (% by mass); 0.1 to 1.5 parts by mass of the ultraviolet absorber; and 0.05 to 1.0 parts by mass of the antioxidant and subjecting the resultant to injection molding at an injection temperature of 300° C., an injection speed of 300 mm/sec and a mold temperature of 80° C., is preferably 4 or lower, more preferably 3.8 or lower, and particularly preferably 3.5 or lower. Further, the yellowness of the plate test piece after subjected to a weathering test for 500 hours using Sunshine Weather Meter (85° C., without rain) is preferably 30 or less, more preferably 25 or less, and particularly preferably 20 or less.

As described above, the molded body according to the embodiment maintains the properties such as excellent mechanical strength, heat resistance, electrical property, dimensional stability, flame retardance and transparency of the polycarbonate-based resin (B) while also having excellent surface hardness. In addition, the molded body also has excellent color phase after molding (i.e., low yellowness) and excellent weather resistance. Therefore, the molded body according to the embodiment can be utilized in electric, electronic and office automation equipments, optical media, automobile parts, building components or the like.

Examples of the method for molding the molded body according to the embodiment include compression molding, transfer molding, injection molding, blow molding, extrusion molding, lamination molding and calender molding. In the case of injection molding, regarding injection molding conditions, an injection temperature of 230 to 330° C., an injection speed of 10 to 500 mm/sec and a mold temperature of 60° C. or higher are favorable in terms of improving the surface hardness. Further, since the resin composition according to the embodiment allows increase of the injection speed, it is also favorable in terms of productivity.

EXAMPLES

Hereinafter, the present invention will be described in detail with reference to examples, but the technical scope of the present invention should not be limited thereto. In the examples, "parts" and "%" mean "parts by mass" and "% by mass", respectively.

Further, the respective physical properties in Examples and Comparative Examples were measured by the below-described methods.

[Molecular Weight of (meth)acrylic Copolymer]

A (meth)acrylic copolymer was dissolved in tetrahydrofuran (THF) and subjected to measurement using gel permeation chromatography. Mw, Mn and Mw/Mn of each copolymer were calculated based on a calibration curve for standard polystyrene.

Instrument: HLC-8320GPCEcoSEC manufactured by Tosoh Corporation

Column: TSK gel Super H M-H×3 manufactured by Tosoh Corporation

Mobile phase solvent: THF

Flow rate: 0.6 mL/min

Temperature: 40° C.

Sample concentration: 0.1%

Sample injection amount: 10 μL

Detector: RI (UV)

[Distribution of (meth)acrylate Unit Represented by General Formula (1) in (meth)acrylic Copolymer]

The (meth)acrylic copolymer was dissolved in chloroform ($CHCl_3$) to perform separation using preparative gel permeation chromatography (preparative GPC) for division into a higher molecular weight region and a lower molecular weight region by setting a peak of the elution curve as a boundary. Thereafter, the separated copolymer was measured by $^1H$ NMR, and the mass percentage (H) of the (meth)acrylate unit represented by general formula (1) in the (meth)acrylic copolymer belonging to the higher molecular weight region and the mass percentage (L) of the (meth)acrylate unit (a) represented by general formula (1) in the (meth)acrylic copolymer belonging to the lower molecular weight region were calculated. Additionally, the distribution ratio ((L)/(H)×100%) of the (meth)acrylate unit (a) was calculated.

(Preparative GPC)
Instrument: LC-9104 manufactured by Japan Analytical Industry Co., Ltd.
Column: JAIGEL-2.5H×1, JAIGEL-3H×1 manufactured by Japan Analytical Industry Co., Ltd.
Mobile phase solvent: $CHCl_3$
Flow rate: 3.5 mL/min
Temperature: 40° C.
Sample concentration: 10%
Sample injection amount: 5 mL
Detector: RI (UV)

($^1H$ NMR)
Instrument: Ascend™500 manufactured by Bruker
Solvent: $CHCl_3$
Sample concentration: 2.5 mg/mL
Accumulation number: 16

[Pencil Hardness]
A plate test piece having a thickness of 1.5 mm was prepared, and pencil hardness with which no scratch was observed on the surface of the test piece was measured according to JIS K5600-5-4.

[Transparency]
Haze of a plate test piece having a thickness of 1.5 mm was measured using Haze meter NDH4000 (manufactured by Nippon Denshoku Industries Co., Ltd.) according to JIS K 7136.

[Yellowness]
Yellowness of a plate test piece having a thickness of 1.5 mm was measured using Haze meter NDH4000 (manufactured by Nippon Denshoku Industries Co., Ltd.) according to JIS K 7136.

[Weathering Test]
A plate test piece having a thickness of 1.5 mm was put into a testing machine at 85° C. for 500 hours (without rain) to conduct a weathering test using Sunshine Weather Meter S80 (manufactured by Suga Test Instruments Co., Ltd.). After that, the yellowness was measured according to the above-described yellowness measurement method.

Synthesis Example 1

Synthesis of (meth)acrylic Copolymer a 200 parts by mass of deionized water, 0.5 parts by mass of tricalcium phosphate as a suspension stabilizer and 0.01 parts by mass of sodium dodecylbenzene sulfonate as a surfactant were put into a heatable high-pressure reactor equipped with a stirring device, and then the mixture was stirred. Concurrently, 20 parts by mass of 4-phenylbenzylmethacrylate (a-1), 77 parts by mass of methyl methacrylate (b-1), 3 parts by mass of methyl acrylate (b-2), 0.3 parts by mass of Perbutyl E (manufactured by NOF Corporation) as an initiator and 1.75 parts by mass of normal-octylmercaptan (nOM) as a chain transfer agent were mixed together to prepare a homogeneous monomer solution, which was put into the reactor. The reactor was filled with nitrogen to increase the pressure to 0.1 MPa. A reaction was carried out at 110° C. for an hour followed by 120° C. for 2 hours to complete the polymerization reaction. The resulting bead-like polymer was washed with water and dried to obtain a (meth)acrylic copolymer a.

Synthesis Example 2

Synthesis of (meth)acrylic Copolymer b

A (meth)acrylic copolymer b was obtained in a manner similar to that in Synthesis Example 1, except that the amount of 4-phenylbenzylmethacrylate (a-1) was 40 parts by mass and that the amount of methyl methacrylate (b-1) was 57 parts by mass.

Synthesis Example 3

Synthesis of (meth)acrylic Copolymer c

A (meth)acrylic copolymer c was obtained in a manner similar to that in Synthesis Example 1, except that 4-phenylphenylmethacrylate was used instead of 4-phenylbenzylmethacrylate (a-1) and that the amount of normal-octylmercaptan (nOM) as a chain transfer agent was 2.50 parts by mass.

Synthesis Example 4

Synthesis of (meth)acrylic Copolymer d

A (meth)acrylic copolymer d was obtained in a manner similar to that in Synthesis Example 3, except that phenyl methacrylate was used instead of 4-phenylbenzylmethacrylate.

Synthesis Example 5

Synthesis of (meth)acrylic Copolymer e

A (meth)acrylic copolymer e was obtained in a manner similar to that in Synthesis Example 1, except that benzyl methacrylate was used instead of 4-phenylbenzylmethacrylate (a-1).

Synthesis Example 6

Synthesis of (meth)acrylic Copolymer f

A (meth)acrylic copolymer f was obtained in a manner similar to that in Synthesis Example 1, except that the amount of 4-phenylbenzylmethacrylate (a-1) was 0 parts by mass and that the amount of methyl methacrylate (b-1) was 97 parts by mass.

Synthesis Example 7

Synthesis of (meth)acrylic Copolymer g

A (meth)acrylic copolymer g was obtained in a manner similar to that in Synthesis Example 1, except that 2-phenylbenzylmethacrylate was used instead of 4-phenylbenzylmethacrylate (a-1).

Synthesis Example 8

Synthesis of (meth)acrylic Copolymer h

A (meth)acrylic copolymer h was obtained in a manner similar to that in Synthesis Example 1, except that 4-benzylbenzylmethacrylate was used instead of 4-phenylbenzylmethacrylate (a-1).

Synthesis Example 9

Synthesis of (meth)acrylic Copolymer i

A (meth)acrylic copolymer i was obtained in a manner similar to that in Synthesis Example 1, except that 4-phenoxybenzylmethacrylate was used instead of 4-phenylbenzylmethacrylate (a-1).

Synthesis Example 10

Synthesis of (meth)acrylic Copolymer j

A (meth)acrylic copolymer j was obtained in a manner similar to that in Synthesis Example 1, except that 4-(phenylsulfonyl)benzyl methacrylate was used instead of 4-phenylbenzylmethacrylate (a-1).

The compositions of the above-described Synthesis Examples 1-10 are shown in Table 1. In addition, the physical properties of the (meth)acrylic copolymers obtained in the above-described Synthesis Examples 1-10 are shown in Table 2.

TABLE 1

| (Meth) acrylic copolymer | Composition of (meth)acrylic copolymer (parts by mass) | | | | | | |
|---|---|---|---|---|---|---|---|
| | 4-phenylbenzyl methacrylate (a-1) | 4-phenylphenyl methacrylate | Phenyl methacrylate | Benzyl methacrylate | Methyl methacrylate (b-1) | Methyl acrylate (b-2) | Normal-octylmercaptan (nOM) |
| a | 20 | — | — | — | 77 | 3 | 1.75 |
| b | 40 | — | — | — | 57 | 3 | 1.75 |
| c | — | 20 | — | — | 77 | 3 | 2.5 |
| d | — | — | 20 | — | 77 | 3 | 2.5 |
| e | — | — | — | 20 | 77 | 3 | 1.75 |
| f | — | — | — | — | 97 | 3 | 1.75 |

| (Meth) acrylic copolymer | Composition of (meth)acrylic copolymer (parts by mass) | | | | | | |
|---|---|---|---|---|---|---|---|
| | 2-phenylbenzyl methacrylate | 4-benzylbenzyl methacrylate | 4-phenoxybenzyl methacrylate | 4-(phenylsulfonyl) benzyl methacrylate | Methyl methacrylate (b-1) | Methyl acrylate (b-2) | Normal-octylmercaptan (nOM) |
| g | 20 | | | | 77 | 3 | 1.75 |
| h | | 20 | | | 77 | 3 | 1.75 |
| i | | | 20 | | 77 | 3 | 1.75 |
| j | | | | 20 | 77 | 3 | 1.75 |

TABLE 2

| (Meth) acrylic copolymer | Molecular weight of (meth)acrylic copolymer | | | Distribution of (meth)acrylate unit (a) (% by mass) | | |
|---|---|---|---|---|---|---|
| | Weight average molecular weight (Mw) | Number average molecular weight (Mw) | Dispersion (Mw/Mn) | Higher molecular weight region (H) | Lower molecular weight region (L) | (L)/(H) × 100 |
| a | 11,600 | 6,600 | 1.8 | 20.5 | 19.3 | 94.1 |
| b | 12,500 | 7,000 | 1.8 | 41.2 | 39 | 94.7 |
| c | 13,900 | 7600 | 1.8 | 24 | 16.1 | 67.1 |
| d | 13,700 | 7,600 | 1.8 | 22.3 | 16.7 | 74.9 |
| e | 12200 | 6900 | 1.8 | 20.8 | 19.1 | 91.8 |
| f | 12,300 | 6,900 | 1.8 | — | — | — |
| g | 12,000 | 6,500 | 1.8 | 21.1 | 18.8 | 89.1 |
| h | 12,200 | 6,600 | 1.8 | 20.7 | 19 | 91.8 |
| i | 11,800 | 6,500 | 1.8 | 20.1 | 19.5 | 97.0 |
| j | 12,000 | 6,700 | 1.8 | 21 | 19.1 | 91.0 |

<Production of Resin Pellets>

The (meth)acrylic copolymers obtained in the above-described Synthesis Examples, Iupilon (registered trademark) S-3000 (manufactured by Mitsubishi Engineering-Plastics Corporation, viscosity-average molecular weight: 22,000) as a polycarbonate-based resin, an ultraviolet absorber, a phenol-based antioxidant and a phosphite-based antioxidant were blended at mass ratios shown in Table 3 below. After mixing in a tumbler for 20 minutes, the resultant was supplied into "TEX30HSST" manufactured by The Japan Steel Works, Ltd. equipped with a single vent, and kneaded under the conditions of a screw rotation speed of 200 rpm, a discharge rate of 20 kg/hour and a barrel temperature of 260° C. A molten resin extruded into a strand was rapidly cooled in a water tank, and pelletized using a pelletizer, thereby obtaining pellets of the resin composition.

<Production of Molded Body>

The pellets obtained by the above-described production method were dried at 100° C. for 5 hours and then subjected to injection molding in an injection molding machine ("SE100DU" manufactured by Sumitomo Heavy Industries, Ltd.) using a steel mold at the following injection temperature and injection speed, and a mold temperature of 80° C., thereby obtaining a plate test piece of 50×90×thickness 1.5 mm.

Injection conditions I: injection temperature 260° C., injection speed 200 mm/sec Injection conditions II: injection temperature 300° C., injection speed 200 mm/sec Injection conditions III: injection temperature 260° C., injection speed 300 mm/sec Injection conditions IV: injection temperature 300° C., injection speed 300 mm/sec Using the plate test piece obtained under Injection conditions I, the pencil hardness, the transparency and yellowness after injection molding, and the yellowness after the weathering test thereof were measured according to the above-described methods. The results are shown in Table 3 below. As ultraviolet absorbers and antioxidants, those shown in Tables 4 and 5 were used.

TABLE 3

|  | Symbol | Example 1 | Example 2 | Example 3 | Example 4 | Example 5 | Example 6 |
|---|---|---|---|---|---|---|---|
| (Meth)acrylic copolymer | a | 30 | 30 | 30 | | | |
|  | b | | | | | 30 | 30 |
|  | c | | | | | | |
|  | d | | | | | | |
|  | e | | | | | | |
|  | f | | | | | | |
|  | g | | | | | | |
|  | h | | | | | | |
|  | i | | | | | | |
|  | j | | | | | | |
| Polycarbonate-based resin | B | 70 | 70 | 70 | 70 | 70 | 70 |
| Ultraviolet absorber | C-1 | 0.3 | 0.6 | 0.6 | 1 | 0.3 | 0.6 |
|  | C-2 | | | | | | |
|  | C-3 | | | | | | |
|  | C-4 | | | | | | |
| Phenol-based antioxidant | D-1 | 0.4 | 0.1 | 0.4 | 0.1 | 0.4 | 0.4 |
|  | D-2 | | | | | | |
| Phosphite-based antioxidant | E-1 | 0.03 | 0.03 | 0.03 | 0.03 | 0.03 | 0.03 |
|  | E-2 | | | | | | 2.4 |
| Pencil hardness | | F | F | F | F | F | F |
| Transparency Injection conditions I | % | 1.5 | 1.5 | 1.7 | 1.8 | 1.4 | 1.5 |
| Injection conditions II | | 1.7 | 1.9 | 1.8 | 2 | 1.8 | 1.9 |
| Injection conditions III | | 2 | 2.1 | 2.1 | 2.4 | 1.9 | 2.3 |
| Injection conditions IV | | 2.2 | 2.5 | 2.3 | 2.5 | 2.2 | 2.5 |
| Yellowness | | 2.5 | 2.5 | 2.5 | 3.5 | 3 | 3.5 |
| Yellowness after weathering test | | 14 | 12 | 10 | 10 | 16 | 14 |

|  | Symbol | Example 7 | Example 8 | Example 9 | Example 10 | Example 11 | Example 12 | Example 13 | Example 14 | Example 15 | Example 16 |
|---|---|---|---|---|---|---|---|---|---|---|---|
| (Meth)acrylic copolymer | a | | | | | 30 | 30 | 30 | 30 | 30 | 30 |
|  | b | | | | | | | | | | |
|  | c | | | | | | | | | | |
|  | d | | | | | | | | | | |
|  | e | | | | | | | | | | |
|  | f | | | | | | | | | | |
|  | g | 30 | | | | | | | | | |
|  | h | | 30 | | | | | | | | |
|  | i | | | 30 | | | | | | | |
|  | j | | | | 30 | | | | | | |
| Polycarbonate-based resin | B | 70 | 70 | 70 | 70 | 70 | 70 | 70 | 70 | 70 | 70 |
| Ultraviolet absorber | C-1 | 0.6 | 0.6 | 0.6 | 0.6 | | | | | | |
|  | C-2 | | | | | 0.3 | 0.6 | | | 0.3 | 0.3 |
|  | C-3 | | | | | | | 0.3 | | | |
|  | C-4 | | | | | | | | 0.3 | | |
| Phenol-based antioxidant | D-1 | 0.4 | 0.4 | 0.4 | 0.4 | 0.4 | 0.4 | 0.4 | 0.4 | | 0.4 |
|  | D-2 | | | | | | | | | 0.4 | |
| Phosphite-based antioxidant | E-1 | 0.03 | 0.03 | 0.03 | 0.03 | 0.03 | 0.03 | 0.03 | 0.03 | 0.03 | |
|  | E-2 | | | | | | | | | | 0.03 |
| Pencil hardness | | F | F | F | F | F | F | F | F | F | F |

TABLE 3-continued

|  |  |  |  |  |  |  |  |  |  |  |  |
|---|---|---|---|---|---|---|---|---|---|---|---|
| Trans-<br>par-<br>ency | Injection conditions I | % | 1.9 | 2.3 | 2 | 1.5 | 1.4 | 1.8 | 1.7 | 1.6 | 1.4 | 1.4 |
|  | Injection conditions II |  | 2.1 | 2.6 | 2 | 1.6 | 1.6 | 2.1 | 1.8 | 1.8 | 1.6 | 1.7 |
|  | Injection conditions III |  | 2.1 | 2.5 | 2.2 | 2.5 | 2 | 2.2 | 2 | 1.8 | 1.9 | 2 |
|  | Injection conditions IV |  | 2.5 | 2.9 | 2.6 | 2.9 | 2.1 | 2.4 | 2.2 | 2.2 | 2 | 2 |
|  | Yellowness |  | 2.9 | 3.7 | 2.5 | 3.6 | 3 | 3.5 | 3.7 | 3.2 | 2.9 | 2.8 |
|  | Yellowness after weathering test |  | 11 | 18 | 13 | 13 | 13 | 9.5 | 11.5 | 19 | 15 | 14.5 |

|  | Symbol | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| (Meth)acrylic copolymer | a | 30 | 30 | 30 | 30 |  |  |  |  |
|  | b |  |  |  |  |  |  |  |  |
|  | c |  |  |  |  | 30 |  |  |  |
|  | d |  |  |  |  |  | 30 |  |  |
|  | e |  |  |  |  |  |  | 30 |  |
|  | f |  |  |  |  |  |  |  | 30 |
|  | g |  |  |  |  |  |  |  |  |
|  | h |  |  |  |  |  |  |  |  |
|  | i |  |  |  |  |  |  |  |  |
|  | j |  |  |  |  |  |  |  |  |
| Polycarbonate-based resin | B | 70 | 70 | 70 | 70 | 70 | 70 | 70 | 70 |
| Ultraviolet absorber | C-1 | 1.7 | 0.05 | 0.3 | 0.3 | 0.3 | 0.3 | 0.3 | 0.3 |
|  | C-2 |  |  |  |  |  |  |  |  |
|  | C-3 |  |  |  |  |  |  |  |  |
|  | C-4 |  |  |  |  |  |  |  |  |
| Phenol-based antioxidant | D-1 | 0.4 | 0.4 | 0.01 | 1.5 | 0.1 | 0.1 | 0.1 | 0.1 |
|  | D-2 |  |  |  |  |  |  |  |  |
| Phosphite-based antioxidant | E-1 | 0.03 | 0.03 | 0.03 | 0.03 | 0.03 | 0.03 | 0.03 | 0.03 |
|  | E-2 |  |  |  |  |  |  |  |  |
| Pencil hardness |  | F | F | F | F | F | F | F | 2H |
| Transparency | Injection conditions I | % | 1.8 | 1.4 | 1.8 | 1.9 | 2.5 | 2.3 | 2.5 | 15.8 |
|  | Injection conditions II |  | 2 | 1.5 | 2.1 | 1.9 | 8 | 10 | 11 | 20 |
|  | Injection conditions III |  | 2.4 | 1.9 | 2.5 | 2.1 | 13 | 14 | 16 | 21.5 |
|  | Injection conditions IV |  | 2.8 | 2.2 | 2.9 | 2.6 | 15.5 | 16.5 | 17.5 | 45.5 |
|  | Yellowness |  | 5 | 2.5 | 4.5 | 4.2 | 3 | 2.2 | 3.5 | Unmeasurable |
|  | Yellowness after weathering test |  | 10 | 30 | 18 | 13 | 15 | 14 | 17 | Unmeasurable |

TABLE 4

Ultraviolet absorber

| Product name | Manufacturer | Classification |
|---|---|---|
| C-1 | Seesorb 709 | Shipro Kasei Kaisha Ltd. | Benzotriazole-based |
| C-2 | ADEKA STAB LA-31 | ADEKA Corporation | Benzotriazole-based |
| C-3 | TINUVIN 1577 | BASF | Triazine-based |
| C-4 | Cyasorb UV3638 | Cytec Industries Inc. | Benzoxazinone-based |

TABLE 5

Antioxidant

| Product name | Manufacturer | Classification |
|---|---|---|
| D-1 | ADEKA STAB AO-60 | ADEKA Corporation | Phenol-based |
| D-2 | ADEKA STAB AO-50 | ADEKA Corporation | Phenol-based |
| E-1 | ADEKA STAB 2112 | ADEKA Corporation | Phosphite-based |
| E-2 | Doverphos S-9228 | Dover Chemical Corporation | Phosphite-based |

As shown in Table 3, when injection-molding the resin compositions comprising 0.1 to 1.5 parts by mass of the ultraviolet absorber and 0.05 to 1.0 parts by mass of the antioxidant relative to 100 parts by mass of the resin component in which the (meth)acrylic copolymer a or b and the polycarbonate-based resin were blended (Examples 1 to 16), the surface hardness was high; the transparency was high even when a high injection speed and a high injection temperature were employed; the yellowness after molding was low; and the yellowing degree after the weathering test was low.

Meanwhile, when the amount of the ultraviolet absorber was more than 1.5 parts by mass relative to 100 parts by mass of the resin component in which the (meth)acrylic copolymer a and the polycarbonate-based resin were blended (Comparative Example 1), the yellowness of the molded body after molding was high. Similarly, when the amount of the antioxidant was less than 0.05 parts by mass or more than 1.0 parts by mass relative to 100 parts by mass of the resin component in which the (meth)acrylic copolymer a and the polycarbonate were blended (Comparative Examples 3 and 4), the yellowness of the molded body after molding was high. When the amount of the ultraviolet absorber was less than 0.1 parts by mass relative to 100 parts by mass of the resin component in which the (meth)acrylic copolymer a and the polycarbonate-based resin were blended (Comparative Example 2), the yellowness of the molded body after the weathering test was high.

As in the case of the (meth)acrylic copolymer f, when the amount of the (meth)acrylate unit represented by general formula (1) was less than 5% by mass (Comparative Example 8), the transparency was low. In the case of the resin composition of Comparative Example 8, it was impossible to measure the yellowness because the haze was too large. When using the (meth)acrylic copolymer c or d containing a (meth)acrylate unit in which an ester moiety is directly bonded to a benzene ring (Comparative Examples 5 and 6), the transparency may be deteriorated depending on the injection conditions. Even when the ester moiety and the benzene ring are not directly bonded to each other, as in the case of the (meth)acrylic copolymer e that contains a (meth)acrylate unit having one benzene ring (Comparative Example 7), the transparency may be deteriorated depending on the injection conditions.

The invention claimed is:

1. A resin composition, which comprises: a (meth)acrylic copolymer (A) containing 5 to 85% by mass of a (meth)acrylate unit (a) represented by general formula (1) below and 15 to 95% by mass of a methyl (meth)acrylate unit (b); a polycarbonate-based resin (B); an ultraviolet absorber (C); and an antioxidant (D), the resin composition containing 0.1 to 1.5 parts by mass of (C) and 0.05 to 1.0 part by mass of (D) per 100 parts by mass of a resin component containing (A) and (B):

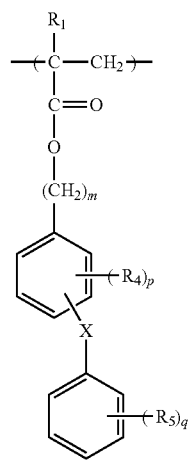

(1)

wherein:

X represents a single bond, or a divalent group selected from the group consisting of —C($R_2$)($R_3$)—, —C(=O)—, —O—, —OC(=O)—, —OC(=O)O—, —S—, —SO—, —SO$_2$— and any combination thereof;

$R_1$ represents a hydrogen atom or a methyl group;

$R_2$ and $R_3$ each independently represent a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a phenylphenyl group, or $R_2$ and $R_3$ may be bonded to each other so as to form a cyclic alkyl group having 3 to 10 carbon atoms together with a carbon atom to which they are attached;

$R_4$ and $R_5$ each independently represent a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or phenylphenyl group;

m represents an integer of 1 to 10;

p represents an integer of 0 to 4; and q represents an integer of 0 to 5; and wherein the (meth)acrylic copolymer (A) includes a higher molecular weight region and a lower molecular weight region that are determined by setting a peak value of GPC elution curve as a boundary, and a ratio ((L)/(H)×100%) of a mass percentage (L) of the (meth)acrylate unit (a) in the (meth)acrylic copolymer (A) belonging to the lower molecular weight region to a mass percentage (H) of the (meth)acrylate unit (a) in the (meth)acrylic copolymer (A) belonging to the higher molecular weight region is 80% to 120%.

2. The resin composition according to claim 1, wherein the mass-average molecular weight of the (meth)acrylic copolymer (A) is 3,000 to 30,000.

3. The resin composition according to claim 1, wherein m in the general formula (1) represents an integer of 1 to 3.

4. The resin composition according to claim 1, wherein X in the general formula (1) represents a single bond, —C($R_2$)($R_3$)—, —C(=O)—, —O—, —SO— or —SO$_2$—.

5. The resin composition according to claim 1, wherein p and q in the general formula (1) represent 0.

6. The resin composition according to claim 1, wherein the ultraviolet absorber (C) comprises at least one of a benzotriazole-based compound, a triazine-based compound and a benzoxazinone-based compound.

7. The resin composition according to claim 1, wherein the blending amount of the ultraviolet absorber (C) is 0.3 to 0.6 parts by mass per 100 parts by mass of the resin component.

8. The resin composition according to claim 1, wherein the antioxidant (D) comprises a phenol-based antioxidant.

9. The resin composition according to claim 8, further comprising a phosphite-based antioxidant.

10. The resin composition according to claim 1, wherein the blending amount of the antioxidant (D) is 0.1 to 0.5 parts by mass per 100 parts by mass of the resin component.

11. The resin composition according to claim 1, wherein the content of the (meth)acrylic copolymer (A) in the resin component is 5 to 60% by mass and the content of the polycarbonate-based resin (B) in the resin composition is 40 to 95% by mass.

12. A molded body molded from the resin composition according to claim 1.

* * * * *